April 13, 1943.   B. CAMPBELL   2,316,559
PORTABLE DRIER
Filed Oct. 2, 1941
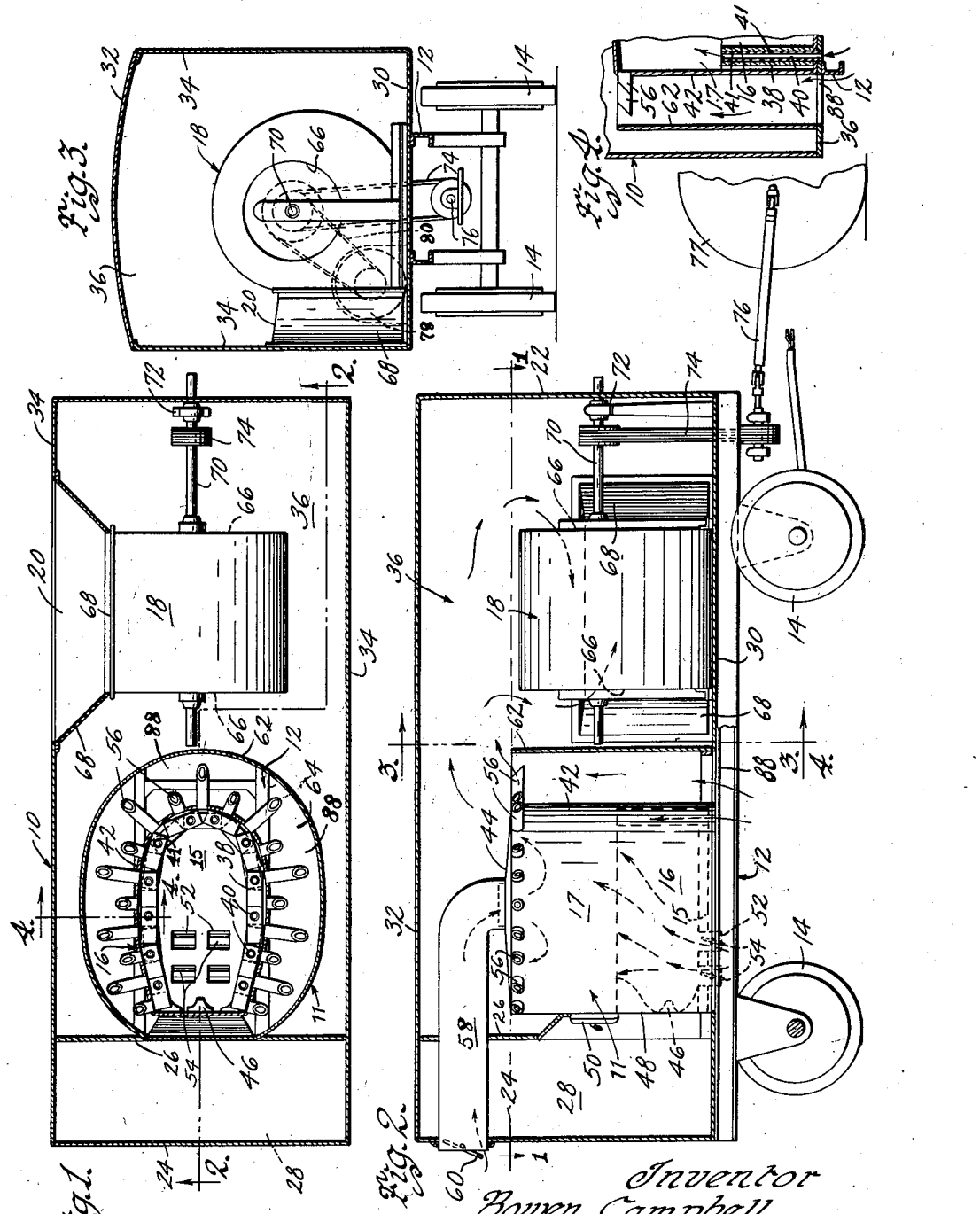
Inventor
Bowen Campbell
by Bair & Freeman
Attorneys Patented Apr. 13, 1943

2,316,559

UNITED STATES PATENT OFFICE 2,316,559

PORTABLE DRIER

Bowen Campbell, Des Moines, Iowa

Application October 2, 1941, Serial No. 413,346

4 Claims. (Cl. 263—19)

My invention relates to driers and particularly those of a construction which can be carried about from place to place so as to be available for use wherever needed.

Among the objects of my invention is the provision of a new and improved drier which is so designed that it is capable of mixing the products of combustion with additional air in a large space so that a complete commingling takes place in order that a correspondingly large volume of moderately warm dry air can be supplied from the device.

Another object is the provision of a new and improved drier of such a construction that it can be mounted upon some means for transporting it from place to place, the drier being built with a combustion chamber and a blower, both housed within an enclosure so that products of combustion emerging from the chamber can be mixed with air drawn into the enclosure causing the interior together with the bodies of the combustion chamber and the fan to be maintained at an elevated temperature in order to more easily control the moderately high temperature of a large volume of mixed gases and air to be supplied for drying purposes.

Still another object is the provision of a new and improved portable drier including a large mixing enclosure designed to collect the combustion gases after they have been mixed and diluted by successive quantities of air introduced at various points as the combustion gases pass from the combustion chamber into the large enclosure, there being provided a fan for drawing the mixture from the enclosure which is shielded from the combustion chamber by baffle means preventing initially heated gases from being drawn directly into the blower inlet.

A further object is the provision of a new and improved heating device designed to heat and mix combustion gases with additional quantities of fresh air so designed that in the walls of the combustion chamber are positioned air passages from the atmosphere to a suitable mixing enclosure performing the double function of cooling the walls of the combustion chamber and at the same time admitting fresh air to be mixed with the combustion gases, there being also provision where occasion requires of a baffle surrounding the combustion chamber to provide passage for supplemental quantities of outside air heated preliminarily by the outer walls of the combustion chamber before being mixed with the gases emerging directly from the chamber.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a top sectional view of an embodiment of the portable drier taken at the line 1—1 of Fig. 2.

Figure 2 is a longitudinal elevation of the drier partly in section taken on the line 2—2 of Figure 1.

Figure 3 is a cross sectional view of the drier taken on the line 3—3 of Figure 2.

Figure 4 is a vertical sectional view through the combustion chamber taken on the line 4—4 of Figure 1.

This case is a continuation in part of my application Serial No. 293,414 filed September 5, 1939, for a Portable drier, issued March 17, 1942, as Patent No. 2,276,715.

Although the mere mixing of the products of combustion with air for the purpose of obtaining a tempered gaseous discharge for heating purposes may not be broadly novel, nevertheless, the application of this principle to the effect that relatively large volumes of very moderately heated air and combustion gases are provided in the manner shown by the application has not heretofore been practiced.

The compact portable device shown provides a large box or compartment 10 supported by a frame 12 upon wheels 14 for transporting it from place to place. Within the box 10 I provide a furnace 11 and a blower 18. The furnace is formed with side walls 42, a top 44, and a bottom 15. The lower half of the furnace I have designated as 16 and will refer to as the combustion chamber. The upper portion of the furnace, designated as 17, serves as a mixing chamber.

In the operation of my device, when combustion takes place in the furnace, the air and all the structural parts within the box 10 are heated. The blower 18 has its inlet opening 66 within the space in the box 10 and draws the heated air from that space, passing it outward from the blower for use wherever it may be needed.

Air for combustion is drawn in through openings 52 in the bottom 15 of the combustion chamber, under the control of dampers 54. Additional air is drawn in through a pipe 58 which leads from outside the box 10 into the center of the top 44 of the mixing chamber 17. An adjustable damper 60 controls the flow of air through the pipe 58. The outlets from the mixing chamber consist of a number of vents 56 which extend horizontally outward from points near the top of the chamber. During the traverse of the additional air from its inlet at the center of top 44 to the vents 56, it is well mixed with the combustion gases rising from the combustion chamber, so that the mixture passing out through the vents will be quite uniform, and at a temperature low enough to be safe.

The combustion chamber itself is provided with liner walls 38 as shown in Figure 1, comprising heat resisting blocks making up the side walls of the chamber. A plurality of vertical air passages 40 pass through the walls communicating with the atmosphere at the lower end and with the interior of the mixing chamber at the upper end. The vertical passages are formed by inserting pipes 41 in the walls, these pipes serving also as ties to hold the blocks in place as the portable drier is moved around.

A burner 46 is located at the rear side 48 of the combustion chamber. A door 50 opens into the mixing chamber and gives convenient access to the combustion chamber.

The box 10 has a front end 22, a rear end 24, a bottom 30, a top 32, and sides 34. A partition 26 closes off a space 28 behind the furnace 11. With the exception of the end 24, these members form an enclosure for a space 36 of large volume, permitting the mixture of the hot gases with additional air before they pass to the blower 18.

A baffle 62 roughly conforming to the shape of the furnace wall 42 substantially encircles it at a distance therefrom, forming an air passage 64 from the bottom 30 of the enclosure 36 to a plane adjacent the discharging vents 56. The passage 64 is open to atmosphere at the bottom, the frame 12 being visible in Figure 1. The opening is identified as 88. The baffle 62 as shown in the drawing extends to the top of the vents so as to deflect combustion gases emerging therefrom and spread them out into the top portion of the enclosure. Thus a further mixture with incoming air is accomplished.

As seen in Figures 1 and 2, each vent extends out approximately perpendicular to the wall 42 at the point where it is attached thereto. Thus, since the wall 42 is of oval form, the vents project in various directions. Furthermore, the vents 56 are of different lengths, as best seen in Figure 1, so that in addition to being directed in various radial directions, the hot air emerging therefrom is blown at a greater or less distance from the combustion chamber, depending upon the lengths of the vent pipes.

The blower 18, here shown as a centrifugal type fan, is located within the enclosure 36. The eye or inlet of the fan is at 66 and the outlet at 20. The inlet 66 draws air directly from the enclosure 36. The outlet 20 is formed by a funnel shaped piece 68 designed to spread the gas delivered therefrom into a relatively large area. The fan member of the blower, not shown, is mounted axially upon a shaft 70 which extends forwardly within the box 10 to a forward bearing post 72. The blower in the design shown is adapted to be driven through a belt 74 and flexible shaft 76 connected to an attaching tractor 77 shown in full lines in Figure 2.

In operation, a fire is made in the combustion chamber. The suction of the blower 18 sets up a draft of air for combustion, entering through the combustion air inlet openings 52, the size of which can be adjusted by manipulating the dampers 54. The gaseous combustion vapors comprising products of combustion thus formed are mixed with incoming air in the mixing chamber above the combustion chamber where the quantity of fresh air can likewise be controlled by manipulation of an adjustable damper 60. By introducing fresh air into the mixing chamber the gaseous vapors are modified somewhat in temperature before they are drawn out radially in all directions through the vents 56.

More air is likewise drawn upward between the baffle 62 and the combustion chamber casing 42 through the inlet hole 88 at the bottom. Air coming through 88 warms a slight amount by coming into contact with the combustion chamber casing and as it ascends becomes mixed with the mixed products of combustion and air emerging from the vents 56. The baffle 62 forming as it does a supplemental air inlet passage also serves as a deflecting fence for urging the hot gases coming out of the vents upwards in order that they may be mixed with the large volume of air within the enclosure 36. While the air and combustion gases are thus being mixed the ultimately mixed product is drawn inward at the inlet 66 of the blower and then forced outward at the outlet 20.

There are no cool masses within the box 10 to chill the air coming into contact with them. This serves to maintain a volume of air and gas at a substantially uniform temperature before it is passed outward from the enclosure to the blower outlet.

It will thus become apparent that there has been provided a new and improved portable drying apparatus which is so designed that it can mix relatively large quantities of air with a correspondingly small amount of combustion gas in order to raise the temperature of a sizeable volume of mixed air and gas to a moderately high degree for use in drying operations. The number of drier parts are kept to a minimum and so positioned that the heating apparatus and the blower are immediately adjacent to each other so that only a minimum of space may be required. Baffles and air streams are additionally supplied in order to keep the walls of the combustion chamber from becoming overheated, which might otherwise concentrate the heat supplied too greatly in one portion only of the enclosure.

It is desirable to keep the large volume of air within the enclosure at a uniformly moderate heat so that when it is supplied for drying purposes there may be no scorching of the products to be dried, yet adequate heat for the desired drying functions.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a portable drier, air heating and mixing means consisting of an enclosure, a furnace therein, a combustion chamber in the lower portion of said furnace, a mixing chamber in the upper portion of said furnace, an air inlet, opening centrally into the top of said mixing chamber, means controlling the flow of air into said inlet, and a plurality of directive outlet vents distributed around the periphery of said mixing chamber adjacent the top thereof, said vents consisting of pipes extending outwardly from said mixing chamber in various directions.

2. In a portable drier, air heating and mixing means consisting of an enclosure, a furnace therein, a combustion chamber in the lower portion of said furnace, a mixing chamber in the upper portion of said furnace, an air inlet opening centrally into the top of said mixing chamber, a plurality of outlet vents in the top of said mixing chamber, and a baffle surrounding said furnace and extending from the floor of said enclosure up to said vents, the floor of said enclosure having an opening to atmosphere between said baffle and the wall of said furnace.

3. In a portable drier consisting of an enclosure with air heating and mixing means and a blower therein, the improvement in air heating and mixing means consisting of a furnace, air inlet openings thereinto, a plurality of hot air outlet vents adjacent the top of the furnace, said vents consisting of alternate long and short pipes extending outwardly from the furnace into said enclosure in various directions, and a baffle surrounding said furnace and extending from the floor of said enclosure to the top of said vents.

4. In a portable drier, air heating and mixing means consisting of a furnace, a combustion chamber in the lower portion thereof, a mixing chamber in the upper portion thereof, a firebrick lining for said combustion chamber, and pipes extending vertically through said lining, communicating with atmosphere at one end and with said mixing chamber at the other end, and serving to keep said lining in place when said drier is moved about.

BOWEN CAMPBELL.